US007629704B2

(12) United States Patent
Hench

(10) Patent No.: US 7,629,704 B2
(45) Date of Patent: Dec. 8, 2009

(54) METHOD AND APPARATUS FOR CONVERTING OCEAN WAVE ENERGY INTO ELECTRICITY

(75) Inventor: Steven C. Hench, Dallas, TX (US)

(73) Assignee: Seadyne Energy Systems, LLC, Dallas, TX (US)

( * ) Notice: Subject to any disclaimer, the term of this patent is extended or adjusted under 35 U.S.C. 154(b) by 0 days.

(21) Appl. No.: 12/167,740

(22) Filed: Jul. 3, 2008

(65) Prior Publication Data

US 2008/0265582 A1 Oct. 30, 2008

Related U.S. Application Data

(63) Continuation of application No. 11/585,614, filed on Oct. 24, 2006, now Pat. No. 7,453,165.

(51) Int. Cl.
*F03B 13/10* (2006.01)
*F03B 13/12* (2006.01)
(52) U.S. Cl. .......................................... 290/53; 290/42
(58) Field of Classification Search .................. 290/53, 290/42
See application file for complete search history.

(56) References Cited

U.S. PATENT DOCUMENTS

| 1,502,511 | A | | 7/1924 | Marvin ......................... 60/501 |
| 2,990,803 | A | | 7/1961 | Henderson ............. 114/230.27 |
| 3,001,371 | A | | 9/1961 | Gilmore et al. .......... 405/195.1 |
| 3,231,749 | A | | 1/1966 | Hinck III ..................... 290/53 |
| 3,691,573 | A | * | 9/1972 | Laudato, Jr. .................. 441/16 |
| 4,168,556 | A | | 9/1979 | Fink et al. ................... 114/264 |
| 4,266,143 | A | | 5/1981 | Ng .............................. 290/53 |
| 4,317,047 | A | * | 2/1982 | de Almada .................... 290/53 |
| 4,340,821 | A | | 7/1982 | Slonim ........................ 290/53 |
| 4,352,023 | A | | 9/1982 | Sachs et al. ................... 290/42 |
| 4,405,866 | A | | 9/1983 | Masuda et al. ................ 290/53 |
| 4,423,334 | A | | 12/1983 | Jacobi et al. .................. 290/53 |
| 4,438,343 | A | | 3/1984 | Marken ........................ 290/53 |
| 4,490,621 | A | | 12/1984 | Watabe et al. ................. 290/42 |
| 4,531,063 | A | * | 7/1985 | Vielmo et al. ................. 290/53 |
| 4,631,921 | A | * | 12/1986 | Linderfelt .................... 60/501 |
| 4,748,338 | A | * | 5/1988 | Boyce ......................... 290/42 |

(Continued)

OTHER PUBLICATIONS

International Search Report, and the Written Opinion issued for PCT/US2009/031675; dated Mar. 30, 2009; 8 pages.

*Primary Examiner*—Nicholas Ponomarenko
*Assistant Examiner*—Pedro J Cuevas
(74) *Attorney, Agent, or Firm*—Fulbright & Jaworski L.L.P.

(57) ABSTRACT

A method and apparatus for harnessing power associated with ocean waves and converting that power into electricity. The apparatus is a buoy that houses a vertically oriented central shaft, a pendulum, and a generator. As the buoy tilts from the vertical under the influence of wave motion, the pendulum is accelerated and rotates about the central shaft. A centrally-placed generator is mechanically coupled to, and driven by, the rotating pendulum so that the pendulum's kinetic energy is converted into electricity. The electricity may be stored at or near the buoy or transferred to a remote facility. Moreover, a fin array located along the bottom of the buoy serves as an anti-torque mechanism and improves the operational efficiency of the electricity production. The method involves employing use of the centrally located generator and the fin array to efficiently harness wave power.

15 Claims, 6 Drawing Sheets

U.S. PATENT DOCUMENTS

| | | | |
|---|---|---|---|
| 4,781,023 A | 11/1988 | Gordon | 60/506 |
| 4,843,250 A * | 6/1989 | Stupakis | 290/53 |
| 4,851,704 A * | 7/1989 | Rubi | 290/53 |
| 4,954,110 A | 9/1990 | Warnan | 441/22 |
| 5,048,356 A * | 9/1991 | Levko | 74/60 |
| 5,341,757 A | 8/1994 | Digiacomo | 114/230.27 |
| 5,424,582 A | 6/1995 | Trepl, II et al. | 290/53 |
| 5,499,889 A | 3/1996 | Yim | 405/76 |
| 5,696,413 A | 12/1997 | Woodbridge et al. | 310/15 |
| 5,789,826 A | 8/1998 | Kumbatovic | 290/53 |
| 5,929,531 A | 7/1999 | Lagno | 290/53 |
| 6,020,653 A | 2/2000 | Woodbridge et al. | 290/53 |
| 6,216,625 B1 | 4/2001 | Baluha | 114/210.27 |
| 6,647,716 B2 | 11/2003 | Boyd | 60/398 |
| 6,681,572 B2 | 1/2004 | Flory | 60/507 |
| 6,833,631 B2 | 12/2004 | Van Breems | 290/42 |
| 6,994,047 B1 | 2/2006 | Pent, III | 114/230.27 |
| 7,105,939 B2 * | 9/2006 | Bednyak | 290/42 |
| 7,199,481 B2 * | 4/2007 | Hirsch | 290/42 |
| 7,239,038 B1 * | 7/2007 | Zimmerman et al. | 290/54 |
| 7,298,054 B2 * | 11/2007 | Hirsch | 290/42 |
| 7,319,278 B2 * | 1/2008 | Gehring | 290/53 |
| 7,453,165 B2 * | 11/2008 | Hench | 290/53 |
| 2007/0137195 A1 | 6/2007 | Tayla et al. | 60/497 |
| 2007/0138793 A1 * | 6/2007 | Zimmerman et al. | 290/1 R |
| 2007/0251230 A1 * | 11/2007 | Zimmerman et al. | 60/497 |
| 2008/0093858 A1 | 4/2008 | Hench | 290/53 |
| 2008/0224472 A1 * | 9/2008 | Bean | 290/42 |
| 2009/0008942 A1 * | 1/2009 | Clement et al. | 290/53 |
| 2009/0127856 A1 * | 5/2009 | Hench | 290/42 |
| 2009/0160191 A1 * | 6/2009 | Beane | 290/53 |

* cited by examiner

METHOD AND APPARATUS FOR CONVERTING OCEAN WAVE ENERGY INTO ELECTRICITY

CROSS-REFERENCE TO RELATED APPLICATIONS

This application is a continuation of and claims priority to U.S. patent application Ser. No. 11/585,614 entitled "METHOD AND APPARATUS FOR CONVERTING OCEAN WAVE ENERGY INTO ELECTRICITY," filed on Oct. 24, 2006, the disclosure of which is expressly incorporated by reference herein.

TECHNICAL FIELD OF THE INVENTION

The present invention relates to the generation of electric power. More specifically, the present invention relates to a method and apparatus for converting ocean wave energy to electricity and the exploitation thereof.

BACKGROUND OF THE INVENTION

The notion of harnessing the power of ocean waves has held mankind's attention for quite some time. As such, there have been several inventions directed towards converting the kinetic energy of waves into electrical energy. However, to date, such inventions have been largely ineffective. One such invention, disclosed in U.S. Pat. No. 3,231,749, provides a "Wave Power Generator" having a buoy with a centrally mounted vertical shaft and a pendulum rotatably fixed to the shaft. The '749 patent further includes a weight fixed to the outer end of the pendulum and a generator fixed to the outer side of the weight.

The '749 patent calls for a generator mechanism to be placed along the peripheral of the pendulum arm and employs an outer planetary gear to generate power. As a practical matter, factors such as manufacturing complexity, mechanical stress, and thermal expansion would render the disclosed invention unreasonably expensive to maintain and inefficient to use. For instance, it is unlikely that the outer planetary gear would be able to maintain a perfectly circular shape, absent expensive bracing. As is known in the art, as the diameter of the outer gear increases, the mass of the structural support required to maintain circularity of the pendulum's motion under operational stress increases at a ratio greater than one-to-one. In the likely event that the outer planetary gear becomes eccentric, the pendulum mechanism would become bound or jammed, rendering the system less efficient or inoperable. Avoiding the problem of eccentricity would best be negated by placing some sort of spring-loaded device or other suspension mechanism along the pendulum to allow the pendulum to move freely. Such a mechanism also would be unreasonably expensive, complex, and difficult to maintain. Moreover, the pendulum's operating efficiency would be reduced as the suspension mechanism absorbs a portion of the pendulum's kinetic energy.

Put another way, placing the generator mechanism far from the center of rotation also places the torque moment far from the center of rotation. When the torque moment is too far off-center, any eccentricity in the rotating pendulum is amplified.

The '749 patent is inadequate for other reasons as well. For instance, the disclosed invention does not address how torque exerted on the buoy by the pendulum is handled. Without an effective "anti-torque" mechanism, the mechanical resistance of the generator will cause the buoy to rotate with the pendulum as it swings within the buoy. Because the generator is mounted to the buoy itself, the generator will see no rotation at its own frame of reference. This results in the buoy simply rotating in the ocean, and thus completely ineffective for producing energy.

BRIEF SUMMARY OF THE INVENTION

The present invention is a device for converting wave energy into useable power. The device comprises a pendulum arranged to rotate with a pivot point under the influence of wave motion. A support is provided for the pivot point. Also, the device is characterized by fins for engaging the medium in which the waves are formed so as to allow the pendulum and the pivot point to rotate with respect to the support. A generator mechanism is positioned to operate based upon rotation of said pivot point.

The present invention is also a method for generating electrical power. The method comprises allowing water waves to rotate a pendulum with a pivot point, providing a support for said pivot point, and applying a counter-rotational force to said support so as to allow said pendulum and said pivot point to rotate with respect to said support.

Further, the present invention is a system for converting wave energy into electrical energy. The system comprises a buoyant member comprising a pendulum configured to rotate under the influence of wave motion and a generating means for generating electricity by converting energy associated with said rotating pendulum, a transfer means for transferring said generated electricity, and a processing facility for processing said transferred electricity.

Finally, the present invention is an apparatus for converting wave energy into electricity. The apparatus comprises a pendulum configured to rotate with a central shaft under the influence of wave motion, a generator aligned with said central shaft to centralize torsional force exerted upon said apparatus, and a plurality of fins extending from said apparatus, said plurality of fins configured to hold said apparatus substantially rotationally stationary with respect to said pendulum.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

BRIEF DESCRIPTION OF THE DRAWINGS

For a more complete understanding of the present invention, reference is now made to the following descriptions taken in conjunction with the accompanying drawing, in which.

DETAILED DESCRIPTION OF THE INVENTION

Figure 1:
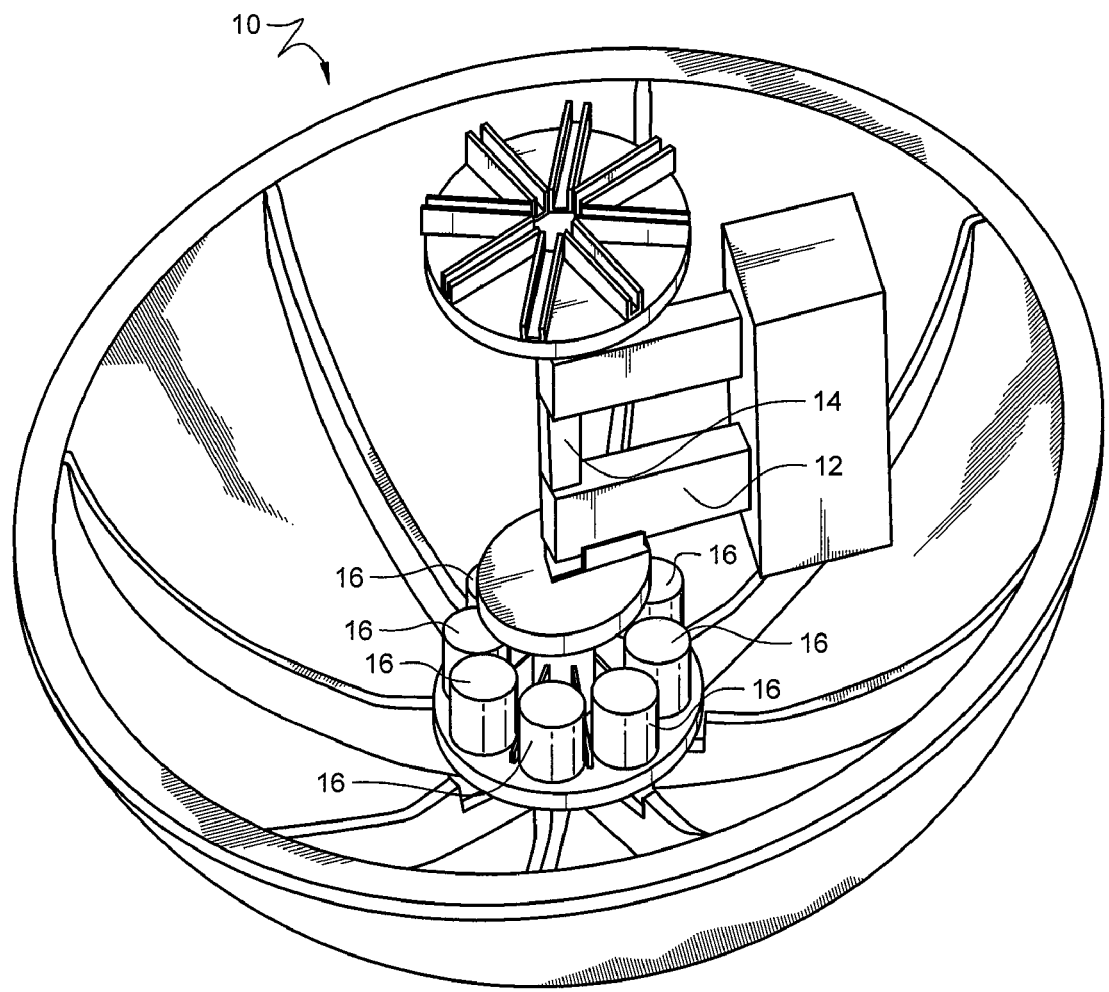
FIG. 1 shows one embodiment of a buoy in accordance with the invention.

Apparatus 10 is a buoy that houses components which facilitate harnessing the kinetic energy of ocean waves and converting that energy into electrical energy. As will be further discussed, components within buoy 10 comprise a pendulum 12 rotating about a vertically-oriented shaft 14 within buoy 10, as buoy 10 tilts under the influence of wave motion. Rotating pendulum 12 drives a centrally located generator mechanism 16. The generated energy can then be stored at buoy 10 or transferred by conductors 60 to a remote storage facility 62. Also, embodiments are envisioned where an array of buoys 10 are employed through a cable grid 50.

Figure 2:
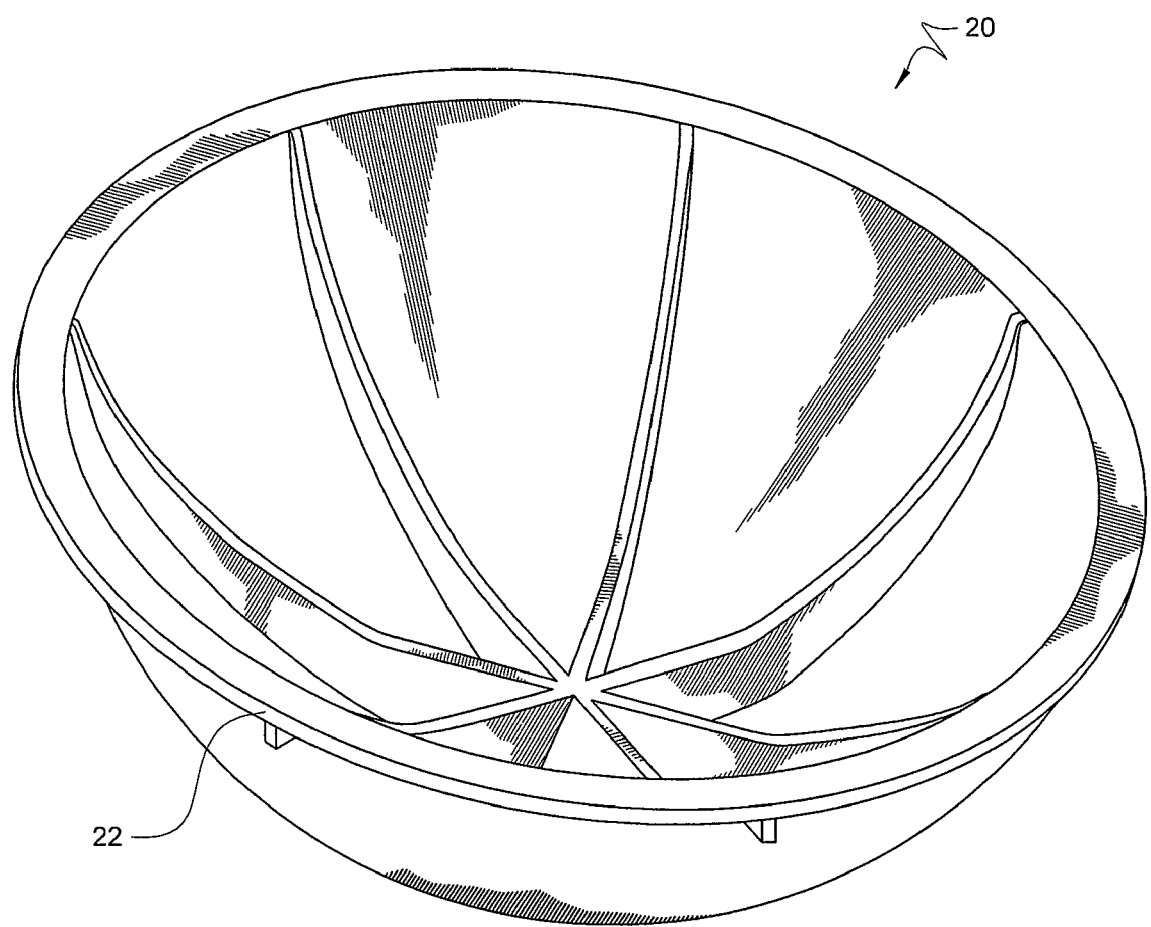
FIG. 2 shows an embodiment of a buoy shell component in accordance with one aspect of the present invention.

As seen in FIG. 2, buoy 10 is characterized by a bottom shell component 20 and a corresponding top shell component (not shown). Bottom shell component 20 and the top shell component are preferably hemispherical in shape and are of identical dimension, where each may be combined with the other to form an enclosure having an oblate spherical shape. Preferably, the shell components are comprised of buoyant materials having relatively high strength. For instance, embodiments are envisioned where the shell components comprise composite materials, such as fiberglass or carbon fiber. However, other suitable materials will be readily apparent to those skilled in the art. Portions of bottom shell component 20 and the top shell component may be filled with a material such as foam, to enhance seaworthiness and reduce costs.

Regions within buoy 10 may be enclosed and filled with ballast, or be set to neutrally buoyant by compartmentalizing buoy 10 and venting one or more of those compartments to the ocean. This arrangement is thought to provide uniform buoyancy for buoy 10, so that buoy 10 does not have a tendency to tilt in a static position.

The tilt of buoy 10 in still water, or the static angle, preferably does not exceed three to five degrees from a horizontal plane. To examine pendulum behavior, the static angle must first be subtracted from the substantially wedge-shaped cross section of a wave that initiates pendulum movement, when pendulum 12 is substantially positioned at top of dead center. By way of example, for a common wave having a height to length, or peak to trough, ratio of 1 to 5, the average angle of the wave is approximately 11.3 degrees. Where the "back tilt" of buoy 10 is approximately three degrees, pendulum 12 must develop enough torque about shaft 14 to overcome startup friction with an overall tilt of 8.3 degrees. As pendulum 12 rotates about shaft 14 buoy 10 tilts that 3 degree distance along with it, which will be added to, rather than subtracted from, the wave's angle. Thus, for the given wave, at the bottom of the swing, the angle of buoy 10 (and pendulum 12) would be the sum of 11.3 degrees and three degrees, or 14.3 degrees. As seen, pendulum 12 increases in torque throughout the power stroke.

Preferably, the shell components combine to form an oblate sphere having a length to height ratio of three to one, or greater. Such a length to height ratio allows buoyant forces associated with the apparatus to be sufficiently distributed along its length, thereby counterbalancing the downward force exerted by the pendulum mass. The center of gravity of pendulum 12 preferably lies between shaft 14 and no more than half of the radial distance between shaft 14 and the peripheral of buoy 10. This configuration allows sufficient buoyancy to counter the pendulum mass, so that buoy 10 does not become locked in a tilted position. Also, such mathematically reproducible dimensions allow for improved efficiency in production and assembly. A length to height ratio of three to one, or greater, is desirable as it yields a configuration whereby the curvature of the combined shell components allow buoy 10 to move gracefully with, as opposed to "slapping" against, the waves. Finally, when buoy 10 is an oblate sphere having a diameter to height ratio of approximately three to one, buoy 10 has a sufficiently large surface area-to-displacement ratio.

In exemplary embodiments the diameter of buoy 10, mass of pendulum 12, arm length of pendulum 12, and the center of force for the outboard buoyancy are interrelated. However, it is generally preferred that buoy 10 will exhibit a ratio of buoyancy to working mass on the order of between seven to one and ten to one. That is, the mass of fluid displaced by buoy 10 is seven to ten times greater than the mass of pendulum 12. The present inventor has found that when this condition is a satisfied, a displacement-to-ballast ratio is achieved that provides ample buoy response to wave motion.

Bottom shell component 20 has flange 22 along its outer circumference. Likewise, the top shell component would have a matching flange extending along its outer circumference. Bottom shell component 20 can be secured to the top shell component by inserting a fastening means, such as a series of bolts or screws, through aligned apertures in the respective flanges. Also, the flanges preferably have a gasket between them to enhance the seal formed between the shell components. Other useful means by which the shell components are joined to one another will be apparent to those skilled in the art. For instance, embodiments are envisioned where the shell components are joined by a welding means or clamping means.

As mentioned before, pendulum 12 is housed within buoy 10. During operation, pendulum 12 rotates about central shaft 14, which extends between central points of each shell component. As buoy 10 moves under the influence of wave motion it tilts with respect to a horizontal plane. As such, pendulum 12 is accelerated by gravity towards the point within buoy 10 having the lowest potential energy. When accelerated in such fashion, pendulum 12 is constrained to rotate about central axis 14 in a plane perpendicular to central shaft 14. As can be easily envisioned, the traveling rise and fall motion of the waves will cause buoy 10 to tilt from side-to-side, thereby changing the point of lowest potential energy within buoy 10. As this happens, pendulum 12 will be accelerated from one point within buoy 10 to another, all the while rotating between those points.

Importantly, the present inventor understands that the semi-random nature of wave motion is not conducive to allowing pendulum 12 to rotate in a constant direction, i.e., clockwise or counter-clockwise. As such, embodiments are configured to allow pendulum 12 to rotate freely in the clockwise or counter-clockwise direction. As will be further discussed, in either case, the kinetic energy of pendulum 12 may be captured by generator 16.

Referring again to FIG. 1, generator mechanism 16 is in mechanical communication with pendulum 12 and central shaft 14 so that rotation of pendulum 12 and central shaft 14 causes generator 16 to rotate. Preferably, generator 16 comprises a gear that is engaged with a gear located at shaft 14. As shaft 14 rotates, its gear drives the gear on generator 16. Other useful embodiments are envisioned where generator 16 is in communication with shaft 14 by another means known in the art. For example, generator 16 and shaft 14 may be in mechanical communication via a belt or chain mechanism.

According to preferred embodiments, generator 16 has an axis of rotation in close proximity to the axis of rotation of shaft 14. This arrangement allows the torque moment of generator 16 to be close to the torque moment of shaft 14. As such, the total torque felt at buoy 10 is substantially centralized. Overall, this improves the mechanical efficiency of buoy 10, that is, such a configuration provides improved flexibility in dealing with torsional loads exerted upon buoy 10 and other components, and allows various gearing ratios and power transmission alternatives to be explored.

Useful embodiments of buoy 10 comprise a plurality of generators 16, each being equally spaced about shaft 14. This provides for a particularly efficient power transmission mechanism from pendulum 12 to generator 16. According to such an arrangement generators 16 are redundant. Moreover, the symmetric arrangement of each the generators about shaft 14 allows the torque moment of a single generator 16 to be offset by the torque moment of another generator 16.

During rotation, pendulum 12 is supported by footings placed along the peripheral of pendulum 12. These footings extend around the hull of each shell component. Such an arrangement provides for efficient operation as friction is reduced and moving parts, such as gears, are not used to support pendulum 12 within the shell components.

The configuration described above provides for efficient assembly of buoy 10. That is, during assembly pendulum 12 can be held in place, by a jig for example, while shell component stringers engage the footings of pendulum 12. Preferably, pendulum 12 footings comprise channel steel or some similar material. Once contact is made, the jig can be retracted and the shell components fastened to one another along their respective flanges. As such, mounting pendulum 12 within buoy 10 does not require fasteners. Instead, pendulum 12 is held fixed about its axis of rotation by the pre-load pressure created by the engagement of the shell components.

The embodiments disclosed herein are particularly efficient at handling the torque exerted on buoy 10 by pendulum 12. During use, the torque exerted upon buoy 10 by pendulum 12 will have two components: torque exerted around the vertical axis and torque exerted around the horizontal axis. Torque exerted around the vertical axis results from rotation of pendulum 12 about axis 14. As discussed, generator 16 converts the associated mechanical energy into electrical energy. Torque around the horizontal axis is brought about by the weight of pendulum 12 itself. However, the mechanical coupling between bottom shell component 20 and the top shell component allows effective dispersion of that torque throughout entire buoy 10. That is, the shell components are joined to one another to effectively distribute the torque around the horizontal axis.

As mentioned, pendulum 12 rotates within buoy 10 thereby turning generator 16. However, generator 16, and other mechanical components housed within buoy 10 for that matter, mechanically resist the rotation. That is, generator 16 "pushes against" pendulum 12. As such, if buoy 10 is not equipped with a mechanism to overcome this mechanical resistance, buoy 10 will simply rotate with pendulum 12.

Figure 3:
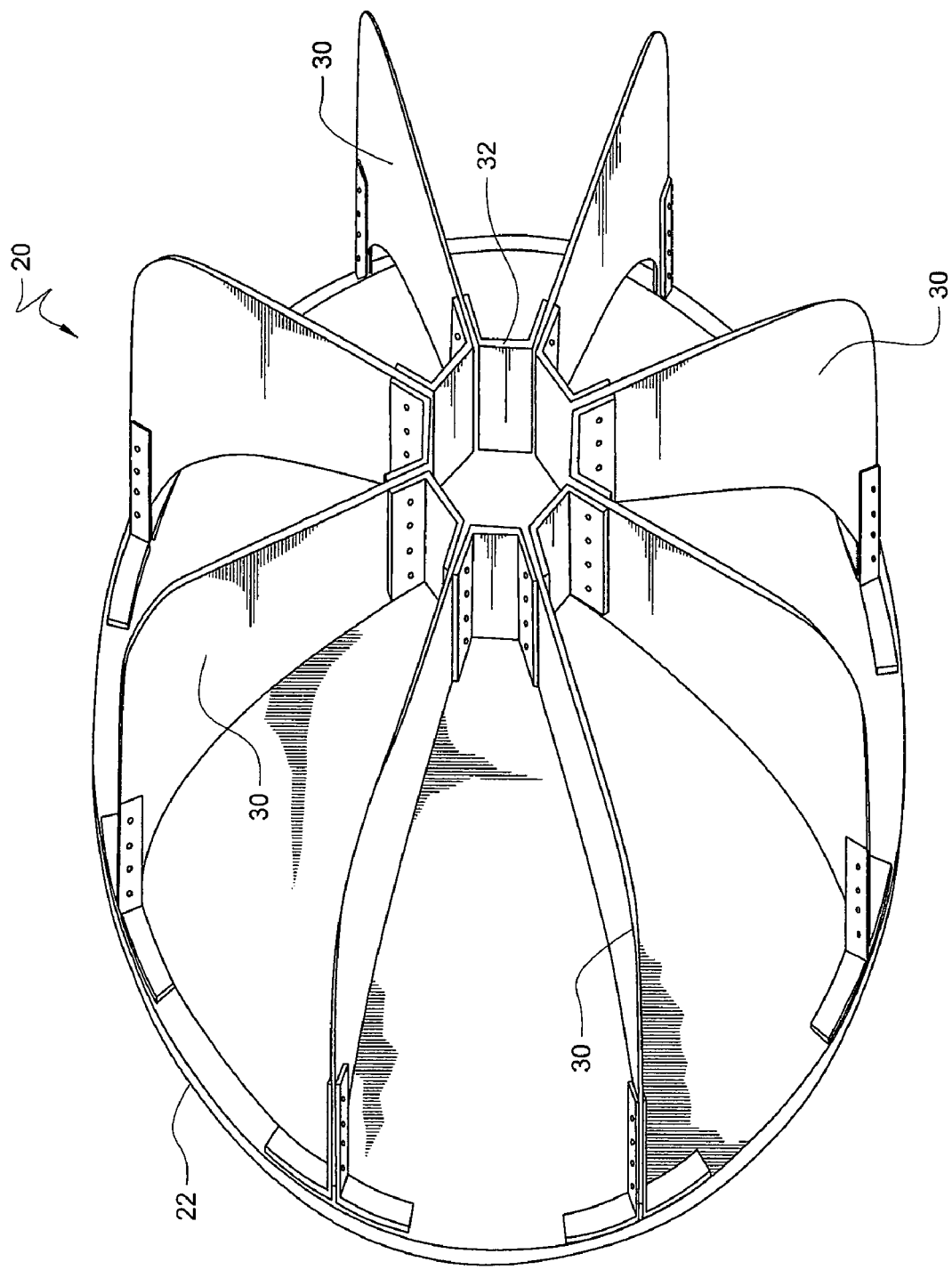
FIG. 3 shows an embodiment of a buoy fin array component in accordance with one aspect of the present invention.

Referring to FIG. 3, fins 30 extend from bottom shell component 20. In the preferred embodiment, fins 30 collectively form a fin array, which serves as a "counter-torque" mechanism providing sufficient resistance to overcome the mechanical resistance of generator 16 and other components. Specifically, fins 30, acting together, entrain a mass of water sufficient to hold buoy 10 rotationally stationary as pendulum 12 rotates within buoy 10. Fins 30 should be of sufficient size to effectively inhibit rotation of buoy 10 so that pendulum 12 can do work against generator 16. As such, fins 30 can be of sufficient dimension to entrain a mass of water several times larger than the mass of pendulum 12.

As seen in FIG. 3, fins 30 are attached to buoy 10 by coupling to flange 22. Coupling fins 30 to flange 22 may be accomplished by screwing or bolting fins 30 to flange 22 by means known in the art. There are any number of mechanisms by which fin array 30 can be attached to buoy 10. However, coupling fins 30 directly to flange 22 in such manner is preferred because it allows each fin 30 to be easily attached or detached from buoy 10. As such, each fin 30 of the fin array is preferably a separate, non-integral component that can be replaced in the event it is damaged or otherwise needs to be replaced. Because each fin 30 is an external item, different sizes can be used depending on the size of buoy 10, prevailing ocean conditions, etc.

Again referring to FIG. 3, each fin 30 extends radially from a central portion of bottom shell component 20. However, as seen, fins 30 do not meet one another at a central point. Instead, fins 30 are coupled to one another by a bracketing ring 32. The use of bracketing ring 32 is preferred as it imparts relatively high strength to fin array 30. According to particular embodiments, fins 30 may be bolted on or screwed to bracketing ring 32. As such, individual fins may be removed by unbolting that fin from flange 22 and ring 32, and a replacement fin may be inserted in its place.

Figure 4:
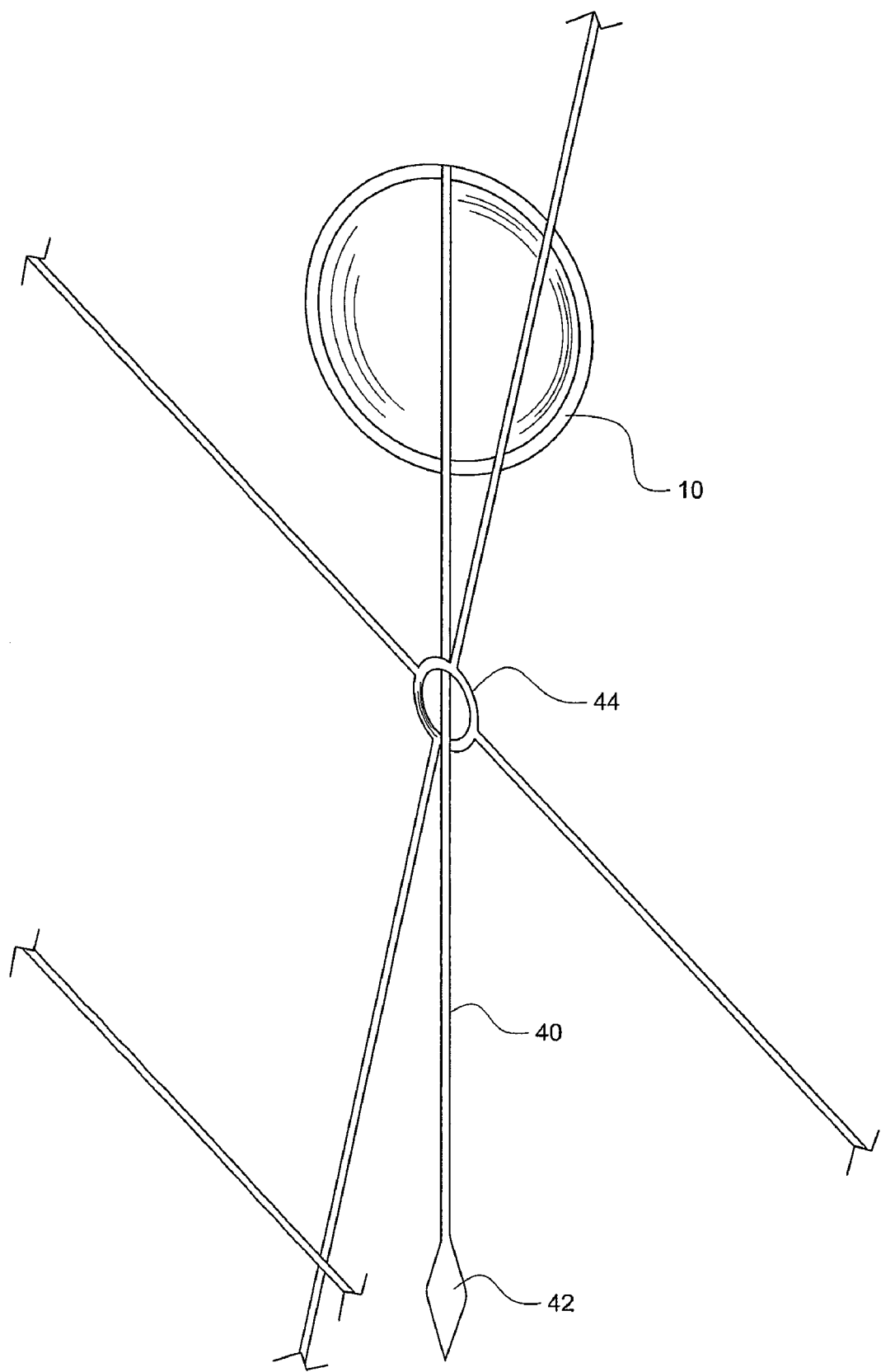
FIG. 4 shows a buoy mooring system according to one aspect of the present invention.

Referring to FIG. 4, mooring line 40 is shown extending between buoy 10 and counterweight 42, through restraining ring 44. In a preferred embodiment, mooring line 40 extends from a central point of buoy 10, for instance the central point of bottom shell component 20, so that buoy 10 remains balanced along the water surface. According to preferred embodiments, mooring line 40 is configured with buoy 10 to allow unconstrained rotation of the buoy 10 without creating torsion on mooring line 40. Specifically, counterweight 42, attached along the bottom end of mooring line 40, allows buoy 10 to move up and down along the wave surface according to wave motion. Counterweight 42 also serves as a bottom-centered ballast and a means to pull buoy 10 back into vertical alignment with restraining ring 44. Importantly, mooring line 40 freely moves within restraining ring 44, vertically and rotationally, and is constrained within restraining ring 44 by counterweight 42. Such an arrangement is thought to be particularly beneficial in that buoy 10, and likewise mooring line 40, can rotate without twisting or breaking mooring line 40.

Figure 5:
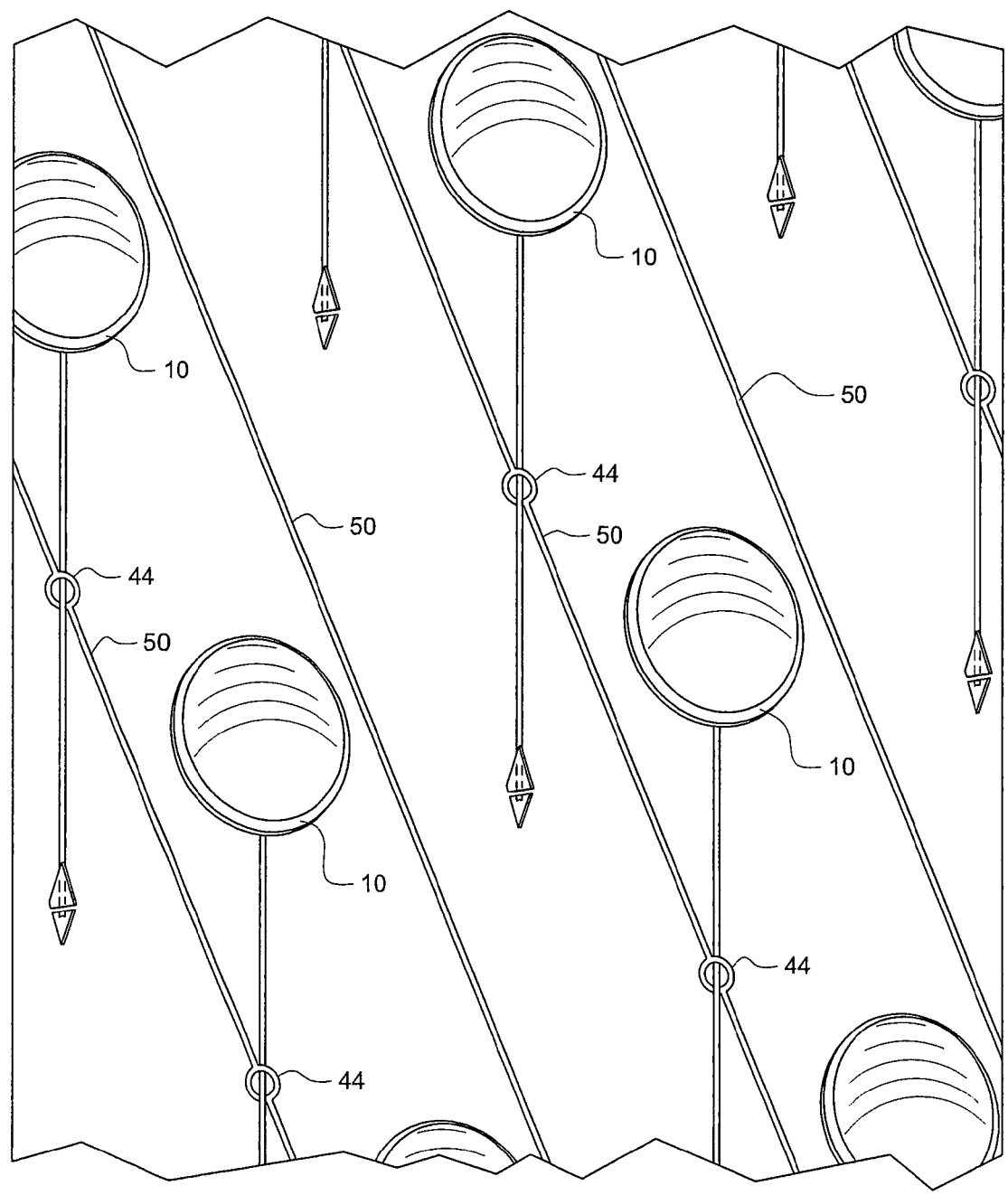
FIG. 5 shows a buoy array according to one aspect of the present invention.

As best seen in FIG. 5, a plurality of buoys 10 can be arranged in relative proximity to one another to form a buoy array. As shown, a number of restraining rings 44 are placed within a grid of cables 50. Cables 50, in combination with rings 44, form an anchoring base for the buoy array. Each buoy 10 is associated with its own mooring line 40, counterweight 42, and restraining ring 44. As a result, each buoy 10 is provided a range of vertical and lateral motion so as to maximize wave-induced motion while preventing contact with adjacent buoys.

Figure 6:
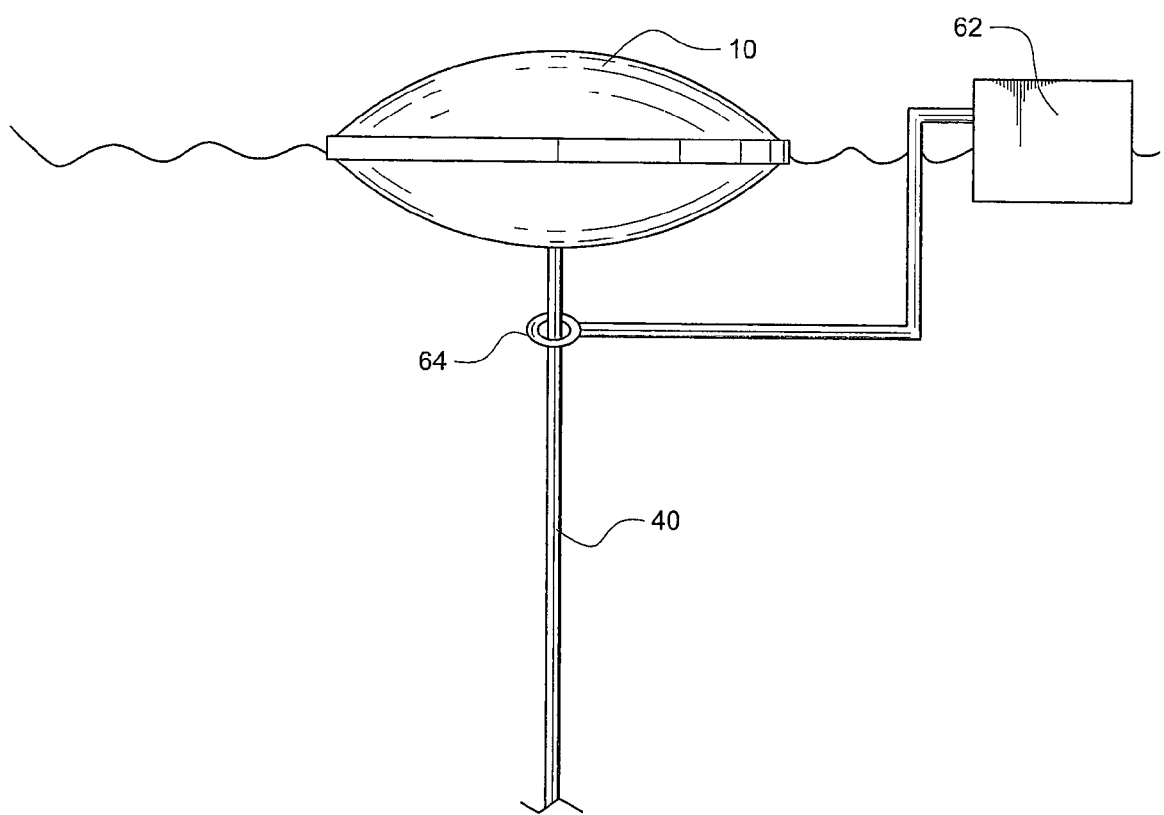
FIG. 6 shows an electricity production system according to one aspect of the present invention.

Referring to FIG. 6, power communication means 60 is shown extending between buoy 10 and power storage unit 62. Preferably, power communication means 60 is a conductor that transfers electrical current between buoy 10 and a remote location, such as power storage unit 62. As shown, power communications means 60 is attached to buoy 10 at or near the top of mooring line 40. Further, power communications means 60 is attached to mooring line 40 using a sealed slip ring 64, as known in the art. A sealed slip ring is preferable because it allows each buoy 10, and likewise mooring line 40, to freely rotate without causing communication means 60 to wrap around mooring line 40. As such, binding or strain placed on communication means 60 from undue rotation is avoided. Power communication means 60 can transfer electricity from buoy 10 to power unit 62 as electricity is generated, or electricity may be stored on buoy 10 and transferred at a later time.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

The invention claimed is:

1. A device for converting wave energy into useable power, said device comprising:
   a pendulum arranged to rotate with a pivot point, said rotation caused by wave action;
   a support for said pivot point;
   fins for engaging the medium in which said waves are formed so as to allow said pendulum and said pivot point to rotate with respect to said support; and
   a generator mechanism positioned to operate based upon rotation of said pivot point, said generator mechanism comprising:
   a plurality of generators, each of said plurality of generators equally spaced about said pivot point and each of said plurality of generators operable in both the clockwise and counter-clockwise direction.

2. The device of claim 1 wherein said medium is water.

3. The device of claim 1 wherein said pivot point is an elongated shaft extending substantially perpendicular to the plane of rotation of said pendulum.

4. The device of claim 1 wherein said pendulum rotation is caused by tilting said pendulum with respect to a horizontal plane.

5. The device of claim 1 further comprising:
   a plurality of said devices spaced apart over an expanse of said medium; and
   means for gathering the energy generated from at least one of said plurality of said devices.

6. The device of claim 1 further comprising:
   means for tethering said device in a vicinity in said medium.

7. The device of claim 6 wherein said means for tethering allows said device to move vertically under the influence of wave motion.

8. The device of claim 1 wherein said generator mechanism is further positioned to reduce torque imbalance exerted upon said device.

9. A method for generating electrical power, said method comprising:
   allowing water waves to rotate a pendulum with a pivot point;
   providing a support for said pivot point;
   applying a counter-rotational force to said support so as to allow said pendulum and said pivot point to rotate with respect to said support; and
   actuating a plurality of generators, each of said plurality of generators equally spaced about said pivot point and being operable in either the clockwise or counter-clockwise direction, in response to said rotation.

10. The method of claim 9 wherein said applying comprises:
    engaging a mass of water with sufficient resistance to apply said counter-rotational force.

11. The method of claim 9 wherein said allowing is accomplished by tilting said pendulum with respect to a horizontal plane.

12. The method of claim 9 further comprising:
    generating electrical energy by converting energy associated with said rotating pendulum.

13. The method of claim 12 wherein said generating further comprises:
    centralizing torsional forces associated with said converting.

14. The method of claim 9 further comprising:
    tethering said support in a vicinity in said water.

15. The method of claim 14 wherein said tethering comprises:
    allowing said support to move vertically under the influence of wave motion.

* * * * *